(12) United States Patent
Gouget et al.

(10) Patent No.: US 9,454,755 B2
(45) Date of Patent: Sep. 27, 2016

(54) TRANSACTION METHOD BETWEEN TWO ENTITIES PROVIDING ANONYMITY REVOCATION FOR TREE-BASED SCHEMES WITHOUT TRUSTED PARTY

(75) Inventors: Aline Gouget, Paris (FR); Pascal Paillier, Paris (FR)

(73) Assignee: GEMALTO SA, Meudon (FR)

( * ) Notice: Subject to any disclaimer, the term of this patent is extended or adjusted under 35 U.S.C. 154(b) by 1824 days.

(21) Appl. No.: 12/597,877

(22) PCT Filed: Apr. 11, 2008

(86) PCT No.: PCT/EP2008/054455
§ 371 (c)(1),
(2), (4) Date: Nov. 18, 2009

(87) PCT Pub. No.: WO2008/132038
PCT Pub. Date: Nov. 6, 2008

(65) Prior Publication Data
US 2010/0094760 A1    Apr. 15, 2010

(30) Foreign Application Priority Data
Apr. 27, 2007    (EP) .................................... 07301004

(51) Int. Cl.
| G06Q 20/00 | (2012.01) |
| G06Q 20/12 | (2012.01) |
| G06Q 20/06 | (2012.01) |
| G06Q 20/38 | (2012.01) |
| G06Q 20/40 | (2012.01) |

(52) U.S. Cl.
CPC ............. *G06Q 20/12* (2013.01); *G06Q 20/06* (2013.01); *G06Q 20/3823* (2013.01); *G06Q 20/3829* (2013.01); *G06Q 20/40* (2013.01)

(58) Field of Classification Search
USPC .................................. 705/29, 71, 35; 380/30
See application file for complete search history.

(56) References Cited

U.S. PATENT DOCUMENTS

| 5,606,617 | A  | * | 2/1997  | Brands .......................... 380/30 |
| 5,889,862 | A  | * | 3/1999  | Ohta et al. ...................... 705/69 |
| 6,157,920 | A  | * | 12/2000 | Jakobsson et al. .............. 705/69 |
| 6,636,969 | B1 | * | 10/2003 | Jakobsson et al. ............. 713/180 |
| 7,337,322 | B2 | * | 2/2008  | Gentry et al. ................. 713/176 |

OTHER PUBLICATIONS

Bruce Schneier, "Applied Cryptography", 1996, John Wiley & Sons, Inc.*
Nakanishi et al., "Unlinkable Divisible Electronic Cash", 2000, Springer Berlin / Heidelberg.*
Canard et al., "Divisible E-Cash Systems Can Be Tryly Anonymous", 2007, Springer Berlin / Heidelberg.*
International Search Report (PCT/ISA/210) for PCT/EP2008/054455 mailed Sep. 8, 2008.

(Continued)

*Primary Examiner* — Steven Kim
(74) *Attorney, Agent, or Firm* — Buchanan Ingersoll & Rooney PC

(57) ABSTRACT

The invention proposes an off-line divisible e-cash scheme where a user can withdraw a divisible coin of monetary value $n^L$ (n being for example equal to 2) that he can parceled and spend anonymously and unlinkably. The invention allows to protect the anonymity of honest users and to revoke anonymity only in case of cheat for protocols based on a tree structure without using a trusted third party.

8 Claims, 1 Drawing Sheet

(56) References Cited

OTHER PUBLICATIONS

Written Opinion (PCT/ISA/237) for PCT/ EP2008/054455 mailed Sep. 8, 2008.
T. Okamoto, "An Efficient Divisible Electronic Cash Scheme", Advances in Cryptology—Crypto'95, Santa Barbara, Aug. 27-31, 1995, Proceedings of the Annual International Cryptology Conference (CRYPTO), Berlin, Springer, Germany, vol. CONF. 15, pp. 438-451.
A.H. Chan et al., "Easy Come—Easy Go Divisible Cash", Advances in Cryptology—Eurocrypt'98, 18th Annual International Cryptology Conference, Santa Barbara, Aug. 23-27, 1998, Proceedings, Lecture Notes in Computer Science, vol. 1462, Berlin, Springer, Germany, pp. 561-575.
Communication pursuant to Article 94(3) EPC issued in corresponding European Application No. 08 736 163.0-2221 dated Feb. 1, 2012. (4 pages).

* cited by examiner

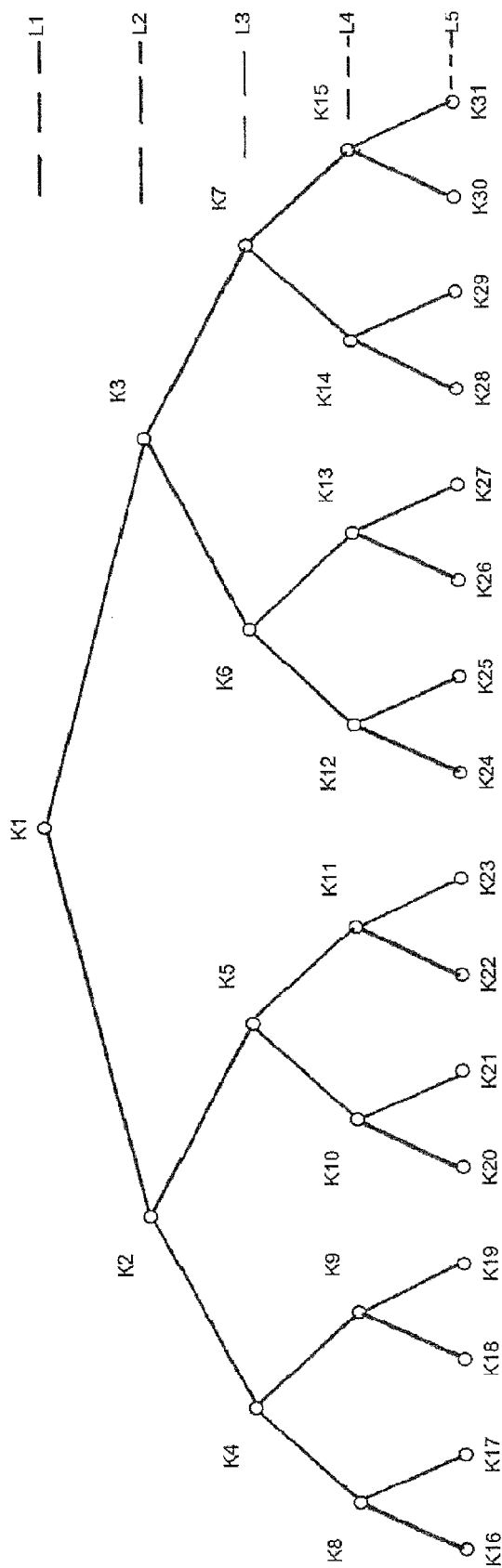

TRANSACTION METHOD BETWEEN TWO ENTITIES PROVIDING ANONYMITY REVOCATION FOR TREE-BASED SCHEMES WITHOUT TRUSTED PARTY

The present invention concerns an electronic cash system allowing users to withdraw electronic coins from a bank, and then to pay a merchant using electronic coins without communicating with the bank or a trusted party during the payment (i.e. in an off-line manner). Finally, the merchant deposits electronically the spent coins to the bank. The invention also concerns electronic devices in which such transaction methods are implemented.

Electronic cash provides user anonymity against both the bank and the merchant during a purchase of a good or a service in order to emulate the perceived anonymity of regular cash transaction. It is highly desired that there is no possibility to link two spending protocols and a spending protocol to a withdrawal protocol.

As it is easy to duplicate electronic data, an e-cash system must also prevent a user from double-spending, i.e. spending two times the same coin. Ideally, the anonymity of honest users must be protected and the identity of cheaters must be recovered without using a trusted third party. An electronic payment system must also prevent a merchant from depositing the same coin twice.

An e-cash system must also be based on efficient protocols. The most critical protocol is the spending phase between the user and the merchant that must be reasonably efficient. It should also be possible to withdraw or spend several coins more efficiently than repeating several times a single withdrawal or spending protocol.

Therefore, currently existing divisible e-cash schemes allow a user to withdraw from the bank a coin of monetary value $n^L$, with n being for example equal to 2, and then to spend this coin in several times at a merchant by dividing the value of the coin. The aim is to allow a user to efficiently spend a coin of monetary value $2^l$, with $0 =< l <= L$, (i.e. more efficiently than repeating $2^l$ times a spending protocol).

Many offline divisible e-cash systems have been proposed in the literature providing part of the security properties mentioned above.

The first practical divisible e-cash system was proposed by T. Okamoto in "An Efficient Divisible Electronic Cash Scheme", Advances in Cryptology—Crypto'95, volume 963 of LNCS, pages 438-451, 1995 and improved by A. H. Chan, Y. Frankel and Y. Tsiounis in "Easy Come—Easy Go Divisible Cash", Advances in Cryptology—Eurocrypt'98, volume 1403 of LNCS, pages 561-575, 1998. Both schemes provide anonymity of users but not unlinkability since it is possible to link several spends from a single divisible coin.

The term "unlinkability" means that any other one except the trusted third party cannot determine whether two payments are made by the same customer. In linkable anonymous e-cash systems, the linked payments enable the other one to trace the payer by other means (i.e., correlating the payments' locality, date, frequency, etc.), as noted in "A Practical and Provably Secure Coalition-resistant Group Signature Scheme" G. Ateniese, J. Camenisch, M. Joye, and G. Tsudik, Advances in Cryptology, Crypto'00, volume 1880 of LNCS, pages 255-270, 2000. Linked payments help anyone to trace the payer.

The first unlinkable divisible e-cash system that fulfills the usual properties of anonymity and unlinkability was proposed by Toru Nakanishi and Yuji Sugiyama in "Unlinkable Divisible Electronic Cash", ISW'00, pages 121-134, 2000. In this paper, that also discloses existing divisible electronic cash systems, efficiency or unlinkability of the systems are compared.

In practice, it is desirable that e-cash systems are divisible, which means that payments of any amount up to the monetary amount of a withdrawn coin can be made. Hereafter, let N be (the total coin amount)/(minimum divisible unit amount). N indicates the divisibility precision, and thus N needs to be large from the viewpoint of convenience. For example, when the total coin amount is $1000 and the minimum divisible unit amount is 1 cent, N is about $2^{17}$.

Therefore, the computational complexity for N is an important criterion in the divisible e-cash systems. In "Short Group Signatures using Strong Diffie Hellman" from D. Boneh, X. Boyen and H. Shacham, Advances in Cryptology-Crypto'04, volume 3152 of LNCS, pages 41-55, 2004 and in "Efficient Publicly Verifiable Secret Sharing Schemes with Fast or Delayed Recovery" from F. Boudot and J. Traore, ICISC'99, volume 1726 of LNCS, pages 87-102, 1999, efficient divisible e-cash systems where all protocols are conducted in O(poly(log N)) are proposed, where poly means the polynomial. However, these systems do not satisfy the unlinkability among the payments derived from the same coin. Thus, the larger N grows, the more easily the payer may be traced owing to the linked payments.

In Toru Nakanishi and Yuji Sugiyama's paper, the computational complexity of all protocols is $O((\log N)^2)$. This e-cash system is based on an e-coupon system. In the e-coupon system, the payment is accomplished by proving the ownership of a withdrawn ticket, which is the bank's digital signature, without revealing the ticket. To detect over-spending, the payer is forced to send values which are the same if and only if the payer uses the same sub-ticket. In the divisible e-cash system of this paper, the binary tree approach is adopted to realize O(poly(log N)) computational complexity as well as the divisible e-cash systems. In this approach, a withdrawn coin has a binary tree, where the root represents the monetary amount of the coin and the other nodes represent the half of the amount of the parent node (n=2). In addition to the proof of the ownership of the coin as well as in the e-coupon system, the payer is forced to send values which are linked if and only if the nodes with the parent-child relationship are used for payments or the same node is used twice or more, which implies over-spending.

The main drawback of these existing systems is that they require a trusted third party to get the identity of the user in case of double-spend detection: This is consequently what can be called a fair divisible e-cash system. Moreover, the unlinkability provided by Toru Nakanishi and Yuji Sugiyama is not strong since the merchant and the bank know which part of the withdrawn divisible coin the user is spending, which is an information leak on the user.

Therefore, none of the divisible e-cash schemes of the state of the art provides simultaneously strong unlinkability and truly anonymity of users.

Usually, the anonymity of users is required in such schemes. When a user U spends a node N, he spends all the descendants of N. However, no information about other nodes of the tree must be given since the privacy of the user must be protected (e.g. in divisible e-cash systems, it must be impossible to link a withdrawal protocol with a user identity as well as to link two spending protocols, and it must be impossible to link a spending protocol to a withdrawal protocol except for the user U).

A trivial solution to ensure anonymity in divisible e-cash schemes is to give one security tag for each coin. A security tag allows getting the identity of the user only in case of a double-spending. This solution is not efficient and then divisible e-cash systems generally use a trusted third party to revoke the anonymity of a cheater. This solution is not satisfactory in practice.

The invention consists in the construction of a security tag (composed by three elements) for divisible e-cash systems. It allows to protect the privacy of honest users and to revoke anonymity of cheaters without a trusted third party in an efficient manner.

The purpose of the invention is more precisely to provide a strong unlinkable and anonymous divisible off-line e-cash system without trusted third party, ensuring user anonymity such that it is impossible for anybody to make any link between spends and withdraws. There is no intervention of a trusted third party to revoke the anonymity of a user that has spent twice the same coin and the user's identity can only be revealed when such a case happens. Therefore, the invention allows to protect the anonymity of honest users and to revoke anonymity only in case of cheaters for protocols based on a tree structure without using a trusted third party.

This purpose is reached by a transaction method between a first and a second entity, the first entity being typically a customer and the second entity being typically a seller or a merchant, the first entity being identified by a public key, the method consisting in transmitting to the second entity a fraction of a divisible coin of electronic cash from an electronic device of the first entity. A divisible coin of value $n^L$ is assigned to a tree of L+2 levels, any node having exactly n direct descendants except the $n^{L+1}$ leaves, such that the value of the tree root at level 1 is $n^L$. The nodes of the levels comprised between level 2 and level L+1 each have a value corresponding to 1/n of the value of their parent node, the nodes of level L+2 have no value.

According to the invention, the method consists in:
Constructing a root key by using a secret only known by the first entity (the customer);
Computing for each direct descendant node of a parent node a key by using a verifiable one-way function, such that it is impossible, expect for the first entity (customer), to compute a key which is not related to a descendant of the targeted node, the computed keys for the n direct descendant nodes being unlinkable between them without the knowledge of the parent node key;
Encrypting said public key with the key of the node to be transmitted to the second entity (the merchant) by using a verifiable randomized encryption scheme E, to obtain a ciphertext that can be decrypted for obtaining the public key;
Transmitting to the second entity (merchant) this ciphertext, the keys of the direct descendants of the node to be transmitted to the second entity, a proof of validity of the correct computing of the ciphertext and the keys of these direct descendants.

This method permits to protect the privacy of honest users and to revoke anonymity of cheaters without a trusted third party in an efficient manner.

Preferably, the root key is also constructed by using a one-way function. This one way function can be identity function.

In a preferable embodiment, the said secret is given to the first entity in a blind manner by a third entity, typically the bank of this first entity.

In a special embodiment, the randomized encryption scheme uses a random value that is transmitted by the second entity to the first entity.

In a preferred scheme, n is equal to 2, i.e. the tree is a binary tree with each parent having two descendants.

Preferably, in order to ensure confidentiality of the transmitted information, the public key of the first entity and the random value are encrypted.

The invention also concerns a portable object, like for example a smart card or a dongle comprising means for implementing such a transaction method.

The following description of a preferred embodiment of the present invention will now be given in regard of the unique FIGURE representing a binary tree corresponding to a divisible coin of electronic cash.

In this FIGURE, it is assumed that an electronic device, for example a smart card or an electronic dongle belonging to a first entity, typically a customer, contains a divisible coin of value $n^L$, with, here, n=2 and L=3.

This is only an example, the invention being applicable to any tree structure of value where each parent node has the same number of descendants at the same level.

In the FIGURE, the root key, referenced by its key $K1$, is at a level L1. This root key has two descendants at a level L2, referenced by their respective keys $K2$ and $K3$. Each of these descendants has also two descendants, $K4$, $K5$ and $K6$, $K7$ respectively, at a level L3. Finally, the nodes $K4$, $K5$, $K6$, $K7$ each have two descendants referenced $K8$ to $K15$ at a level L4. These nodes are the last nodes of the tree having a monetary value. For the sake of understanding what will be exposed in the following, a level L5 is also considered, with terminations referenced $K16$ to $K31$, these last descendants having no monetary value.

This tree can for example be compared to a purse of value $8, one $ being represented by each of the nodes $K8$ to $K15$. Accordingly, each node $K4$ to $K7$ has a value of $2, each node $K2$ and $K3$ has a value of $4 and the tree node has a value of $8. The elementary monetary value of this tree is therefore N=$1.

Generally speaking, a divisible coin of value $2^L$ is assigned to a binary tree of L+2 levels such that the monetary value of the tree root at level 1 is $2^L$ and any other node (comprised between level 2 and level L+1) has a monetary value corresponding to half of the amount of its parent node. The nodes of level L+2 have no value. The value of L is fixed by the system.

The first entity gets this electronic purse from his bank A (constituting a third entity, the second entity being a merchant from which the first entity purchases goods or services) through a withdrawal protocol ensuring that the user U gets a signature in a blind manner from the bank A on his identity u and on a secret value s. At the end of this protocol, U is able to construct the key tree of the FIGURE as it will be described later.

During a preliminary protocol, the first entity (called U like User) gets a signature in a blind manner from an authority A on his identity u and on a secret value s. Knowing this secret s, U is able to construct the root key $K1$ by using the secret s. This secret is only known by U.

Then, knowing the root key $K1$, U computes for each of its descendants in the tree, i.e. for the nodes at level L2, the keys $K2$ and $K3$ associated to these nodes. This computing of keys is done by using a one-way function, called F, such that it is impossible, expect for U, to compute a key which is not related to a descendant of the targeted node (root node in this first step). The computed keys, can be generally called LKey and RKey (for Left Key and Right Key being respectively $K2$ and $K3$) for the two direct descendant nodes of the root node at level L1. These keys LKey and RKey must be unlinkable between them without the knowledge of the parent node key (K1).

The same then applies for all descendant nodes in the tree: For the nodes of level L3, which are the descendants of nodes of level L2, keys K4 to K7 will be computed by using the one-way function F. K4 and K5 are also unlinkable between them without the knowledge of K2, and K6 and K7 are unlinkable between them without the knowledge of K3. Keys associated to the nodes of levels L4 and L5 are computed in the same manner. It has to be noted here that keys K16 to K31 are also computed, even though there is no monetary value associated to the termination nodes of level L5. These nodes can be considered as being "dead" leaves.

After this step, the user U is able to spend money at a merchant M.

Another solution is to calculate the keys only necessary of the spending to be done at the merchant.

For this spend, user U selects the coin to be transmitted to the merchant M. Let's assume that user has bought a good or a service for $1, i.e. that a coin represented by a node of level L4 has to be spent. User U will then have to disclose a node, let's say the node associated to the key K8 (value=$1) to the merchant M.

The disclosure of this node consists in encrypting the public key $pk_u$ of the user U with the key K8 by using a verifiable randomized encryption scheme E (a random number R is used to randomize the encryption), to obtain a ciphertext T that will be transmitted to the merchant M. The ciphertext T can be decrypted by the bank A for obtaining the public key $pk_u$ as it will be apparent hereafter. The keys K16 and K17 of the direct descendants of the node to which K8 is associated are also transmitted to the merchant M, along with a proof of validity of the correct computing of the ciphertext T and the keys K16 and K17. This will further authorize the bank to detect a double spending by the user U or a cheat done by the merchant M.

The following spending rule has to be respected: When a node N is used, none of descendant and ancestor nodes of N can be used, and no node can be used more than once. This rule is satisfied if, and only if, over-spending is protected. The general principle of the invention consists in using a single master serial number from which several serial numbers can be derived. Thus, each node of the tree, which includes the leaves, is also related to a particular value that can be called a tag key. During the spending protocol, the identity of the spender is encrypted with a tag key in such a way that the decryption key can be derived only in case of a double-spending. Using the binary tree approach, each node of the tree is related to a tag key with the following properties:

The root tag key and the identity of the user are signed (in a blind manner) by the bank during the withdrawal protocol.

From the tag key of a node N, it is possible for everyone to compute the tag keys related to the descendant nodes of N. It consequently exists a public deterministic function F that takes as input a tag key $K_{i,b0}$ (where i is the level of the targeted node in the tree and $b_0 \in \{0, 1\}$ depends on the position of K in the tree), a bit b (0 for left and 1 for right in this configuration of binary tree) and possibly some public parameters Params and that outputs a new tag key $K_{i+1,b}$.

$$F:(K_{i,b0},b,\text{Params}) \rightarrow K_{i+1,b}=F(K_{i,b0},b,\text{Params})$$

From the tag key of a node, it is impossible (without the knowledge of the root tag key K1) to compute a tag key which is not related to a descendant of the targeted node.

The serial number of a particular node is the concatenation of the two children tag keys (for example K16 and K17 for node to which K8 is affected in the FIGURE).

The root key K1 can be equal to the secret s but is preferably constructed using a one-way function G which takes as inputs a secret s and eventually some public parameters params and that outputs the key K1. Then we have:

$$G:(s,\text{params}) \rightarrow K1=G(s,\text{params})$$

The function G can also be the identity function (G(s)=s) or bidirectional.

The value s is only known by the user U. For example, for computing the value s, the user U can choose a value s1, the bank sends him a value s2 and the user computes s=s1+s2.

From the key of a node N, it is possible for everyone to compute the keys related to the descendants of N. These keys are computed using the one-way function F which takes as input a key K, a bit b (0 for left and 1 for right) and eventually some public parameters params and that outputs a new key $\tilde{K}$. Then, we have $$F:(K,b,\text{params}) \rightarrow \tilde{K}=F(K,b,\text{params})$$

From the key of a node, it is impossible (except for the user U) to compute a key which is not related to a descendant of the targeted node.

During the spending protocol, the user computes the tag key of the node he wants to spend. This tag key is used to compute the security tag, i.e. the encryption of the spender identity. This encryption should be verifiable and should include randomness.

This randomness should be provided by the merchant to ensure the freshness of the spending, i.e., to prevent merchant from sending twice the same coin to the bank. One solution is to hash for example the date of the transaction or simply to send a random number to the user U. The user also computes the tag keys related to the two direct descendants of the spent node. The concatenation of these two keys is the serial number of the spent coin. This serial number is transmitted during the spend protocol. Later, the bank will compute all the serial numbers of the leaves of the tree (i.e. all keys K2 to K31) in order to detect a possible double-spending. If a double-spending is detected, then the bank has access to the encryption of the identity (from one spending) and the corresponding decryption key (from the other spending). Then, the bank can easily find the identity of the cheater.

Let's present another example: Assume U wants to spend four coins. Then, U selects four unitary coins, e.g. those associated to the node K3. The user U sends to M the values $T=E_{K3}$ (Id, R), LKey=$K_6$, RKey=$K_7$, and S=LK||RK. The random value R used in the encryption scheme is computed using values sent by the merchant. The user U must also prove that the coins are signed by the bank and that it will be possible to identify a double-spender. Consequently, the spending protocol consists also in computing a zero-knowledge proof of knowledge t that corresponds to the predicates:

T is well-formed, i.e. $E_{k3}$ (Id, R) has been computed using:
the tag key $K_3$ derived using F on inputs the root tag key $K_1$ signed by the bank,
the random R that has been chosen by the merchant,
the identity Id (or $pk_u$) signed by the bank.

LKey and RKey are well-formed, i.e., $K_6$ and $K_7$ are both derived from $K_3$ using function F.

If LKey and RKey are well-formed, this implies that the serial number S is also well-formed.

To construct a truly anonymous divisible e-cash system, it is then necessary to provide the one-way function F, a verifiable encryption scheme E and a proof $\Phi$.

The function F is for example the modular exponentiation. Other solutions are possible, as long as this function is a verifiable one-way function.

The function of the proof of knowledge $\Phi$ is therefore to show to the merchant that LKey, RKey and T are correctly computed, i.e. U proves to M the validity of LKey, RKey and T using an interactive proof of knowledge of a signature of the bank on the values s and $pk_u$.

The identification of a cheater (e.g. by the bank after a double spending detection) can be done according to the following method:

Assume that a double detection has been done, the bank knows two security tags ($T_1$, $LKey_1$, $RKey_1$) and ($T_2$, $LKey_2$, $RKey_2$) together with $\Phi_1$ and $\Phi_2$ associated to the two nodes $N_1$ and $N_2$, and the two random values $R_1$ and $R_2$.

If $LKey_1=LKey_2$ (and thus $RKey_1=RKey_2$), then the bank can directly get the public key $pk_u$ of the cheater.

Else, $N_1$ is an ancestor of $N_2$ or $N_2$ is an ancestor of $N_1$. Assume that $N_1$ is an ancestor of $N_2$. Then the bank can compute the key $K_2$ such that $T_2=E_{K2}(pk_u, R_2)$ from the knowledge of $LKey_1$, $RKey_1$ and the path from $N_1$ to $N_2$, and the next authority can decrypt $T_2$ to get $pk_u$.

The different keys of the tree can be computed in the first entity's smart card or dongle on the fly, it means when the user needs to spend one or more associated coins, or immediately after having received the secret s from the bank A.

Concerning the encryption scheme E of the identity $pk_u$ of the user U, a random number R is preferably used: Given a key K, the encryption of the identity of the user U $pk_u$ is done using the encryption scheme E on the identity $pk_u$ and a random value R with key K. Then, we have $$T=E_K(pk_u,R)$$

The encryption scheme E must satisfy the following properties:

The encryption scheme E is verifiable, i.e., it exists a zero-knowledge proof of knowledge corresponding to the predicate that the ciphertext $T=E_K(pk_u, R)$ can be decrypted to obtain the identity $Pk_u$.

Given $R_1$, $R_2$, $T_1=E_K(pk_u, R_1)$ and then $T_2=E_K(pk_u, R_2)$, it must be possible to recover $pk_u$ without the knowledge of the key K (unusual property).

The invention then also consists in sending by the user to the merchant the security tag (T, LKey, RKey) and a proof that the coins are true coins (signed by the authority, typically the bank) and that it will be possible to identify a double-spender. Consequently, this protocol consists also in computing a zero-knowledge proof of knowledge $\Phi$ that corresponds to the following predicates:

The ciphertext T can be decrypted to obtain the identity of the spender

The key used to obtain T is derived from the root key that is signed by the authority The two revealed descendant keys are derived from the key used to obtain T.

A specific implementation example is now given below:

Let k be a security parameter. A group G of order p is considered. The elements $g_0$, $g_1$, $g_2$ are randomly chosen in G. L+1 groups are considered.

$$H_0=<h_0>, H_1=<h_1>, \ldots H_L<h_L>$$

The authority randomly chooses the following elements:

$$h_{0,0} \in H, h_{1,0}, h_{1,1} \in H_1, h_{2,0}, h_{2,1} \in H_2, \ldots, h_{L,0}, h_{L,1} \in H_L$$

whose logarithms to the base $h_0$, $h_1$, ..., $h_L$ are unknown respectively. The authority computes the key pair ($sk_A$, $pk_A$) of a Camenish-Lysyanskaya signature scheme that will permit it to sign the secret values of users.

The blind signature scheme used in this construction is the Camenish-Lysyanskaya signature scheme described in "Signature schemes and anonymous credentials from bilinear maps", J. Camenish and A. Lysysanskata, Crypto'04 with Pedersen Commitment ("Non-interactive and information-theoretic secure verifiable secret sharing, T. Pedersen, Crypto'91).

U identifies himself to the authority A by proving the knowledge of $u=sk_u$.

U and A both participate preferably to the randomness of the secret s. First U selects a random value $s' \in Z_p$ and a random value $r \in Z_p$. U sends to A a commitment on the values s' and r as follows:

$$C'=g_0^{s'} g_1^{u} g_2^{r}$$

Then A picks a random value $r'Z\epsilon_p$ and computes the value $C=C'g_0^{r'}$ where $s=s'+r'$.

U and A run the Camenish-Lysyanskaya protocol's for obtaining A's signature on committed values s and u. As a result U obtains $\sigma_A=Sign_A(s,u)$ and the value r'.

U saves the values (s, u, $\sigma$).

The disclosure of a node N by a user U to a merchant M happens as follows:

M sends to U a public random value R

U first computes the key related to the node N using the path from the root tree to the node N, her secret s and the public elements $h_{0,0}$, $h_{1,0}$, $h_{1,1}$, $h_{2,0}$, $h_{2,1}$, ... $h_{L,0}$, $h_{L,1}$ as follows:

(this pseudo-code describes the two functions G and F introduced in the general description)

```
CurrentNode ← root
K ← h^s
i = 0
Do
    If N belongs to leftSubTree(CurrentNode) then
        K = h_{i,0}^K
        CurrentNode = leftSon(CurrentNode)
    Else
        K = h_{i,1}^K
        CurrentNode = rightSon(CurrentNode)
    i = i + 1
While (CurrentNode != N)
Return K and i
```

Indeed we have $G(x)=h^x$ and $F(K,b,params)=(h_{params,b})^K$.

Next U computes the security tag composed by the three following elements: $LKey=(h_{i+1,0})^K$, $RKey=(h_{i+1,1})^K$ and $T=pk_u(K)^R$.

Rq: the verifiable encryption scheme described in the general description is $$E_K(pk_u,R)=pk_u*H(K)^R$$

where H is a verifiable one-way function.

U proves to M the validity of LKey, RKey and T using an interactive proof of knowledge of a signature A on the values s and u (U proves that the values LKey, RKey and T are correctly computed). This proof $\Phi$ can be constructed using standard techniques.

Finally, the identification of a cheater by the bank can be done as follows:

If $LKey_1=LKey_2$ (and thus $RKey_1=RKey_2$), then the authority can directly get the public key $pk_u$ by computing:

$$(T_1^{R1})/(T_2^{R2})\exp(1/(R_2-R_1)=pk_u,$$

since we have $R_1 \neq R_2$ (due to the freshness of the two deposits).

Else, $N_1$ is an ancestor of $N_2$ or $N_2$ is an ancestor of $N_1$. Assume that $N_1$ is an ancestor of $N_2$.

Then the bank can compute the key $K_2$ such that $T_2=pk_u K_2^{R2}$ from the knowledge of $LKey_1$, $RKey_1$ and the path from $N_1$ to $N_2$ by computing $$((T_2)\exp(1/R_2))/K = pk_u.$$

The identity of the cheater is then revealed, this being only possible in case of double spending. Therefore, anonymity of honest users is respected and no trusted third party.

The invention claimed is:

1. Transaction method of transmitting anonymous electronic cash between a first entity (U) identified by a public key ($pk_u$) and a second entity (M) for providing anonymity revocation comprising:
    storing a divisible coin of value $n^L$ in an electronic device;
    assigning the divisible coin of value $n^L$ to a tree of L+2 levels, each node having exactly n direct descendants except the $n^{L+1}$ leaves (at level L+2), such that the value of the tree root at level 1 is $n^L$, the nodes of levels between level 2 and level L+1 each have a value corresponding to 1/n of the value of their parent node, and the nodes of level L+2 have no value;
    constructing a root key (K1) associated with the root node of the tree by using a secret (s) known by said first entity (U);
    computing respective node keys (LKey, RKey) for the n direct descendant nodes of a parent node, by using a verifiable one-way function (F), wherein said computed keys (LKey, RKey) for said n direct descendant nodes are unlinkable between them without the knowledge of the parent node key;
    generating a ciphertext (T) in the electronic device by encrypting the public key ($pk_u$) associated with the first entity (U) with the key of a selected node of a fraction of the divisible coin of electronic cash to be transmitted to said second entity (M) by using a verifiable randomized encryption scheme (E); and
    transmitting, from the electronic device to said second entity (M), a fraction of the divisible coin of electronic cash with said ciphertext (T), the keys of the direct descendants of the selected node and a proof (Φ) of validity of a correct computing of said ciphertext (T) and said keys of said direct descendants.

2. Transaction method according to claim 1, wherein said root key (K1) is constructed by using a one-way function (G).

3. Transaction method according to claim 1, wherein said secret (s) is given to said first entity (U) in a blind manner by a third entity.

4. Transaction method according to claim 1, wherein said randomized encryption scheme uses a random value (R) transmitted by said second entity (M) to said first entity (U).

5. Transaction method according to claim 4, wherein said public key ($pk_u$) and said random value (R) are encrypted.

6. Transaction method according to claim 1, wherein n is equal to 2.

7. Portable object comprising:
    an electronic device having a memory for storing a divisible coin of value $n^L$; and
    a processor able to generate a tree of L+2 levels assigned to the divisible coin of value $n^L$, each node in the tree having exactly n direct descendants except the $n^{L+1}$ leaves (at level L+2), such that the value of the tree root at level 1 is $n^L$, the nodes of levels between level 2 and level L+1 each have a value corresponding to 1/n of the value of their parent node, and the nodes of level L+2 have no value;
    said electronic device further computing and storing thereon:
    a key (K1) associated with the root node of the tree by a secret (s) only known by a first entity (U) identified by a public key ($pk_u$) and associated with the electronic device;
    respective node keys (LKey, RKey) for each direct descendant node of a parent node, wherein said computed keys (LKey, RKey) were created by using a verifiable one-way function (F), such that, said direct descendant nodes are unlinkable between them without knowledge of the parent node key;
    a ciphertext (T) generated by encrypting the public key ($pk_u$) associated with the first entity (U) with the key of a selected node of a fraction of the divisible coin of electronic cash to be transmitted to a second entity (M) by using a verifiable randomized encryption scheme (E).

8. Portable object according to claim 7, wherein said object is a smart card.

* * * * *